United States Patent [19]

Böhme

[11] Patent Number: 4,657,266

[45] Date of Patent: Apr. 14, 1987

[54] PERSONAL SLED

[76] Inventor: Reinhard Böhme, 203 W. 17th St., Olympia, Wash. 98501

[21] Appl. No.: 749,455

[22] Filed: Jun. 27, 1985

[51] Int. Cl.$^4$ .............................................. B62B 15/00
[52] U.S. Cl. ......................................... 280/18; 2/80; 280/12 R
[58] Field of Search ..................... 280/12 R, 12 A, 18, 280/19; 2/80, 69.5

[56] References Cited

U.S. PATENT DOCUMENTS

| | | | |
|---|---|---|---|
| 3,140,878 | 7/1964 | Davis | 280/18 |
| 3,432,181 | 3/1969 | McKee | 280/18 |
| 3,484,801 | 12/1969 | Carlin | 280/18 |
| 3,497,211 | 2/1970 | Nagin | 280/18 |
| 3,637,230 | 1/1972 | Poik | 280/12 |
| 4,046,393 | 9/1977 | Vadnais | 280/19 |

*Primary Examiner*—David M. Mitchell
*Attorney, Agent, or Firm*—Evelyn M. Sommer

[57] ABSTRACT

A personal sled or luge is provided for use by an individual for sledding on snow or ice. The sled comprises a one piece jacket having front and back portions which is adapted to fit over the torso of a sledder. The jacket is open at its upper end to permit a sledder to be able to draw the jacket upwardly about his or her torso. The jacket further includes a crotch portion at its lower end which defines a pair of leg holes for accommodating the sledder's legs. A pair of arm holes are provided for accommodating the sledder's arms. Shoulder straps are provided for securing the sled to the sledder. The jacket is fabricated from a material with a low coefficient of friction relative to snow or ice. The material is preferably a thermoplastic material such as polyethylene or polypropylene or a fabric such as nylon or polyester which is coated with a release agent such as, for example, a silicone release agent. In a particularly preferred embodiment, the material is a closed cell, foamed polyethylene with an integral skin.

7 Claims, 3 Drawing Figures

PERSONAL SLED

BACKGROUND OF THE INVENTION

The present invention relates generally to a personal sled or luge and, more particularly, to such a sled or luge which is adapted to be worn as a jacket over an individual sledder's outdoor clothing.

The use of portable, personal sleds or luges are well known. For example, U.S. Pat. No. 3,140,878, which issued on July 14, 1964 to Thomas E. Davis for a Sled, describes one version of such a sled for use by an individual. Portable sleds are also described in U.S. Pat. No. 3,432,181 which issued on Mar. 11, 1969 to Lee C. McKee for a Toboggan Construction; U.S. Pat. No. 3,484,801 which issued on Dec. 16, 1969 to Eunice A. Carlin for a Roll-Type Toboggan; and U.S. Pat. No. 4,046,393 which issued on Sept. 6, 1977 to Kenneth Vadnais for a Portable Sled.

Each of these patents describes a portable, substantially roll-up type sled or luge which can be used by an individual for sledding over snow or ice. Individuals using certain of these portable, roll-up sleds have, however, often experienced difficulty in remaining on such devices, and falls from such sleds have resulted in injury to the sledders. These same individuals have also had some difficulty in transporting these sleds prior to and after actual sledding.

Against the foregoing background, it is a primary object of the present invention to provide a personal sled or luge which can be used by an individual in snow or ice sledding.

It is another object of the present invention to provide such a sled or luge which can be firmly secured to the sledder to prevent injury.

It is still another object of the present invention to provide such a sled or luge which has a low coefficient of friction with the snow.

It is yet still another object of the present invention to provide such a sled or luge which is easily transportable.

SUMMARY OF THE INVENTION

To the accomplishments of the foregoing objects and advantages, the present invention, in brief summary, comprises a personal sled or luge for use by an individual for sledding on snow or ice. The sled comprises a one piece jacket having front and back portions which is adapted to be drawn up and fit over the torso of a sledder. The jacket is open at its upper end to permit a sledder to be able to draw the jacket upward on his or her torso. The jacket further includes a crotch portion at its lower end which defines a pair of leg holes for accommodating the sledder's legs. A pair of arm holes are provided for accommodating the sledder's arms.

The jacket is fabricated from a material with a low coefficient of friction relative to snow or ice. The material is preferably a thermoplastic material such as polyethylene or polypropylene or a fabric such as nylon or polyester which is coated with a release agent such as a silicone release agent. In a particularly preferred embodiment, the material is a closed cell, foamed polyethylene with an integral skin.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

DESCRIPTION OF THE PREFERRED EMBODIMENTS

Figure 1:
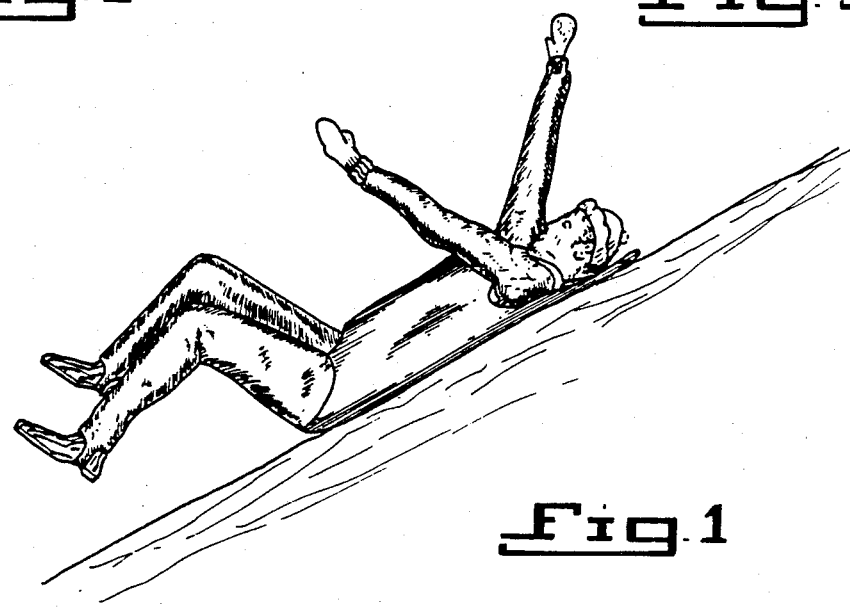
FIG. 1 illustrates an individual sledding using the personal sled of the present invention.

The personal sled or luge of the present invention, referred to generally by reference numeral 10, is shown in FIG. 1 as it may be used by an individual sledder during actual sledding.

Figures 2, 3:
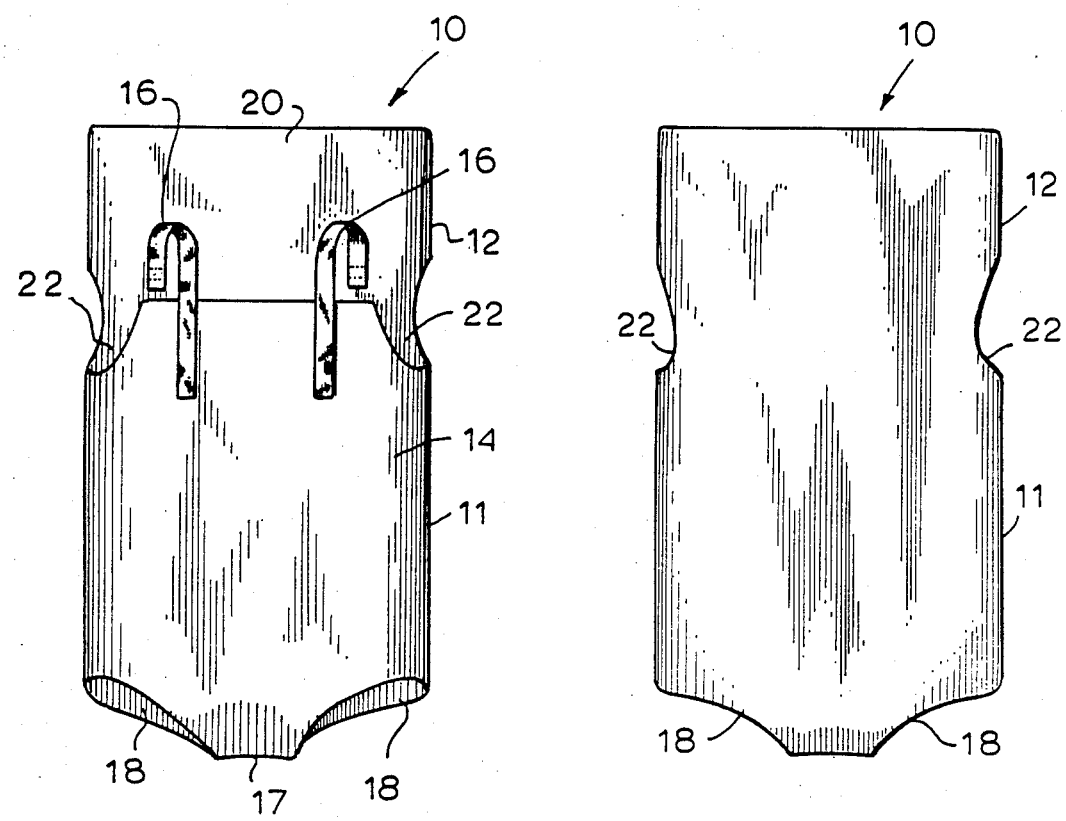
FIG. 2 is a top view of the sled of the present invention.
FIG. 3 is a bottom view thereof.

As shown in greater detail in FIGS. 2 and 3, the personal sled 10 takes the form of a one-piece jacket or envelope 11 which is fabricated from a material having a low coefficient of friction relative to snow or ice to permit the sled 10 to easily pass over the ice or snow. The jacket 11 is adapted to be stepped into and worn by an individual sledder over his or her outer clothing and includes an enlarged, generally rectangular, back portion 12 and a lower, generally rectangular, front portion 14. A pair of shoulder straps 16 are provided connecting the front portion 14 to the back portion 12.

The upper end of the jacket 11 is open to permit the sledder to be able to step or otherwise slip into the jacket 11 and draw the jacket 11 up on his or her torso. A closed crotch portion 17 is provided at the bottom end of the jacket 11 which defines a pair of leg holes 18 for accommodating and permitting the insertion therethrough of the sledder's legs. Cut-out arm portions 22 are provided on opposite sides of the jacket for accommodating the sledder's arms.

The jacket 11 is fabricated from a material which has a low coefficient of friction relative to snow or ice. Preferred types of such material include, for example, polyethylene and polypropylene in extended film form. Alternative types of material include nylon or polyester fabrics which are coated with release agents such as, for example, silicone release agents.

A particularly preferred type of material for the jacket 11 is a closed cell, foamed polyethylene with an integral skin. A preferred type of closed cell, foamed polyethylene is marketed by Dow Chemical under the trademark Ethafoam. The integral skin of the jacket 11 would be placed on the outside of the jacket 11 to contact the snow and the foamed inner surface would be on the inside of the jacket against the body of the sledder. The closed cell, foamed polyethylene serves as a cushion during sledding as well as insulating the sledder from the snow or ice.

As illustrated generally in FIG. 1, the sledder using the personal sled 10 of the present invention steps or slides into the jacket 11 through the upper end thereof. The sledder would insert his or her legs through the leg holes 18 and then pull the jacket 11 upwardly on his or her torso. Arm holes 22 permit the jacket to be worn somewhat higher on the torso since they are intended to accommodate the sledder's arms. The jacket 11 is secured to the sledder's torso by the shoulder straps 16 which fit over the sledder's shoulders.

The personal sled 10 permits a rapid, easy slide down snow covered hills with the sledder sliding in a rear-end first position with the sledder's legs in a raised position off the ground and with the sledder's head resting against the extended back portion.

Having thus described the invention with particular reference to the preferred forms thereof, it will be obvious that various changes and modifications may be made therein without departing from the spirit and scope of the invention as defined by the appended claims.

Wherefore, I claim:

1. A sled for use by an individual for sliding on snow or ice, said sled comprising a one piece jacket, fabricated from a material with a low coefficient of friction relative to snow and ice, and having a lower generally rectangular front portion and an extended generally rectangular back portion, and being adapted to fit around the torso of a sledder, said jacket being open at its upper end so as to permit a sledder to be able to draw said jacket up on his or her torso, and including a crotch portion at its lower end defining a pair of leg holes for accommodating the legs of a sledder, and a pair of arm holes at opposite sides of the jacket's upper end accommodating the arms of a sledder and shoulder straps attached before the upper end of said extended back and extending to the upper edge of said lower front portion for retaining the jacket on the sledder, said back portion extending above said shoulder straps and constituting a headrest for said sledder, whereby when the sledder is attired in such a jacket, with the sledder in rear-end first position with the sledder's legs in a raised position off the ground and with the sledder's head resting against the extended back portion, a rapid and easy slide down the snow-covered hills is obtained.

2. The sled of claim 1 wherein said material is a thermoplastic material.

3. The sled of claim 2 wherein said thermoplastic material is selected from the group consisting of polyethylene and polypropylene.

4. The sled of claim 2 wherein said thermoplastic material is a fabric material which is coated with a release agent.

5. The sled of claim 4 wherein said release agent is a silicone release agent.

6. The sled of claim 4 wherein said fabric is selected from the group consisting of nylon and polyester.

7. The sled of claim 1 wherein said material is a closed cell, foamed polyethylene with an integral skin.

* * * * *